(12) United States Patent
Li et al.

(10) Patent No.: US 11,691,696 B2
(45) Date of Patent: Jul. 4, 2023

(54) RELEASING AND RECOVERY DEVICE OF BOX-TYPE SAMPLING EQUIPMENT

(71) Applicant: First Institute of Oceanography, Ministry of Natural Resources, Qingdao (CN)

(72) Inventors: Zhiyuan Li, Qingdao (CN); Qijun Yu, Qingdao (CN); Daojian Zhang, Qingdao (CN); Haiquan Zhang, Qingdao (CN); Binbin Zhang, Qingdao (CN); Jiaheng Zheng, Qingdao (CN)

(73) Assignee: First Institute of Oceanography, Ministry of Natural Resources, Qingdao (CN)

( * ) Notice: Subject to any disclaimer, the term of this patent is extended or adjusted under 35 U.S.C. 154(b) by 0 days.

(21) Appl. No.: 17/853,968

(22) Filed: Jun. 30, 2022

(65) Prior Publication Data
US 2023/0002014 A1    Jan. 5, 2023

(30) Foreign Application Priority Data
Jul. 1, 2021    (CN) .......................... 202110747908.9

(51) Int. Cl.
*B63B 27/16* (2006.01)
*B63B 27/08* (2006.01)

(52) U.S. Cl.
CPC .............. *B63B 27/16* (2013.01); *B63B 27/08* (2013.01)

(58) Field of Classification Search
CPC ......... B63B 27/16; B63B 27/08; B63B 27/36; B63B 2027/165; Y02A 40/81; B66D 1/00; G01N 1/08; G01N 1/10
See application file for complete search history.

(56) References Cited

U.S. PATENT DOCUMENTS

| 4,683,832 A  | * 8/1987 | Dysarz ................. B63B 35/003 |
|              |          | 405/209 |
| 8,430,049 B1 | * 4/2013 | Tureaud ................. B63B 27/36 |
|              |          | 114/259 |
| 9,708,035 B1 | 7/2017   | Czepizak et al. |

FOREIGN PATENT DOCUMENTS

| CN | 109050839 A | 12/2018 |
| CN | 109080795 A | 12/2018 |
| CN | 109383714 A | 2/2019 |
| CN | 109606573 A | 4/2019 |
| CN | 112960085 A | 6/2021 |
| WO | WO-2019199171 A1 * 10/2019 ............. B63B 21/20 |

* cited by examiner

*Primary Examiner* — Anthony D Wiest
(74) *Attorney, Agent, or Firm* — Bayramoglu Law Offices LLC

(57) ABSTRACT

A device for launching and recovering a box sampler includes a suspension coop, a rail assembly, a moving mechanism, a power unit, and a lifting frame. The rail assembly is fixedly arranged on a deck. The moving mechanism is arranged on the rail assembly and can move along the rail assembly. A fixed end of the power unit is articulated with a top end of the moving mechanism, and an extending end of the power unit is articulated with an open end of an upper frame of the lifting frame. A closed end of the upper frame of the lifting frame is articulated with a front end of the moving mechanism. According to the device for launching and recovering a box sampler, the box sampler can be smoothly launched and recovered. The sampler in the suspension coop can be kept horizontal and is prevented from severely shaking.

5 Claims, 4 Drawing Sheets

RELEASING AND RECOVERY DEVICE OF BOX-TYPE SAMPLING EQUIPMENT

CROSS REFERENCE TO THE RELATED APPLICATIONS

This application is based on U.S. application Ser. No. 17/853,968, filed on Jun. 30, 2022, which claims the priority of Chinese patent application No. 202110747908.9, filed on Jul. 1, 2021, the entire contents of which are incorporated herein by reference.

TECHNICAL FIELD

The present disclosure relates to the technical field of devices for performing sediment sampling for marine scientific research and marine environment investigation and, in particular, to a device for launching and recovering a box sampler.

BACKGROUND

A box sampler is a sediment sampling device having a square or rectangular sampling tube or sampling cylinder, and the box sampler is composed of a pipe support, a sampling box, a counterweight, and a closed shovel. When the box sampler reaches the seabed, the sampling cylinder is inserted into submarine sediments by the gravity of the counterweight, and then the closed shovel rotates to cut the bottom sediments and puts the collected bottom sediments into the sampling cylinder. Due to the large cross-section of the sampling cylinder, the sediments are slightly disturbed or basically undisturbed during sampling. In this way, the collected sample is columnar and tens of centimeters long, which basically maintains the original structure. The box sampler facilitates the study of the physical mechanics and structures of the sediments and provides conditions for the study of the fauna in the sediments and the enrichment of manganese nodules at the bottom of the ocean.

At present, the box sampler is typically launched and recovered by the cooperation between an A-frame and a winch on the ship. However, when in use, the box sampler is inconvenient to operate due to its bulkiness. Especially in the rough sea, the box sampler severely shakes when launched and recovered, which requires several operators to manually stabilize the box sampler. As a result, a sampling device in the box sampler is likely to be damaged, and the manual stabilization process may threaten the safety of the operators.

SUMMARY

The primary objective of the present disclosure is to solve the above problem by providing a device for launching and recovering a box sampler. The device can be conveniently operated, is safe and reliable, and saves manpower.

To achieve the above objective, the present disclosure adopts the following technical solutions.

A device for launching and recovering a box sampler includes a suspension coop, a rail assembly, a moving mechanism, a power unit, and a lifting frame.

The rail assembly is fixedly arranged on a deck; the moving mechanism is arranged on the rail assembly and can move along the rail assembly. A fixed end of the power unit is articulated with a top end of the moving mechanism, an extending end of the power unit is articulated with an open end of an upper frame of the lifting frame, and a closed end of the upper frame of the lifting frame is articulated with a front end of the moving mechanism.

Further, the rail assembly includes two parallel rails, where one rail is provided with a rack, and the other rail is provided with a guide rail.

Further, the moving mechanism includes a base, sliding wheels, a frame, and an actuating device, where two sliding wheels are arranged on each of two sides of the base; the sliding wheel is provided in the rail and can slide on the rail. The frame includes two triangular frame bodies, which are fixedly arranged on the base in parallel. Articulation holes are formed in both the top end and the front end of the frame, and the actuating device is fixedly arranged on the base and is located on the outer side of the frame.

Further, the lifting frame includes the upper frame, a lower frame, and a connecting rod, where the connecting rod connects the upper frame to the lower frame, and an open end of the lower frame is articulated with the suspension coop.

Further, the actuating device includes a power device and gears, where the gears are in transmission connection with the power device and are meshed with the rack.

Further, the moving mechanism further includes guide mechanisms, where the guide mechanism is detachably arranged at a side edge of the base and is located on a side of the base, which is not provided with the actuating device. The guide mechanism is provided in the guide rail.

Further, the guide mechanism includes a bracket and two guide wheels, where the bracket is detachably connected to the base. The two guide wheels are detachably arranged on a lower surface of the bracket. The two guide wheels are respectively located on a side of the guide rail and can roll along the guide rail.

Further, the power unit includes two parallel hydraulic oil cylinders or hydraulic air cylinders.

Further, two gears of the actuating device are configured.

Further, two guide mechanisms are arranged on the same side of the base.

The present disclosure has the following beneficial effects.

(1) According to the device for launching and recovering a box sampler, the rail assembly and the moving mechanism are configured, and the moving mechanism smoothly moves on the rail assembly to drive the lifting frame to turn over, such that the box sampler is smoothly launched and recovered.

(2) According to the device for launching and recovering a box sampler, the lifting frame is articulated with the suspension coop. In this way, the suspension coop is kept horizontal all the time when the lifting frame turns over, so that the sampler in the suspension coop is horizontal all the time, and thus is prevented from severely shaking. Accordingly, damage caused to the sampler by shaking in a rough sea is reduced.

(3) According to the device for launching and recovering a box sampler, only one person is needed to operate the device. Compared with the previous operation of stopping the shaking of the box sampler by multiple persons, the operation greatly saves manpower and reduces the risk of danger to the operators.

Figure 1:
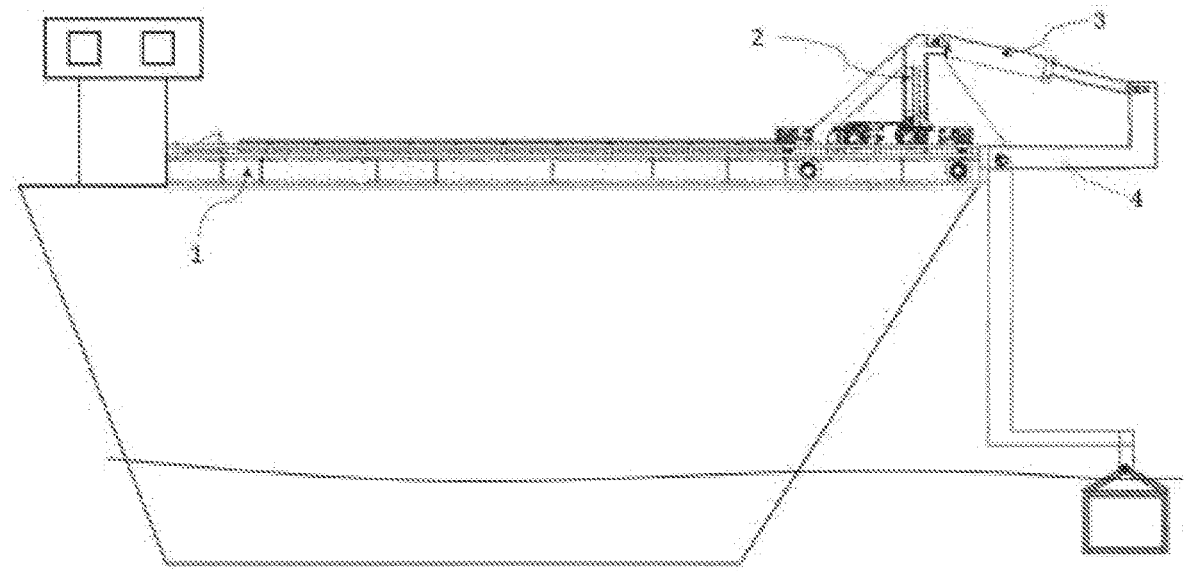
FIG. 1 is a structure diagram of the present disclosure.
Figure 2:
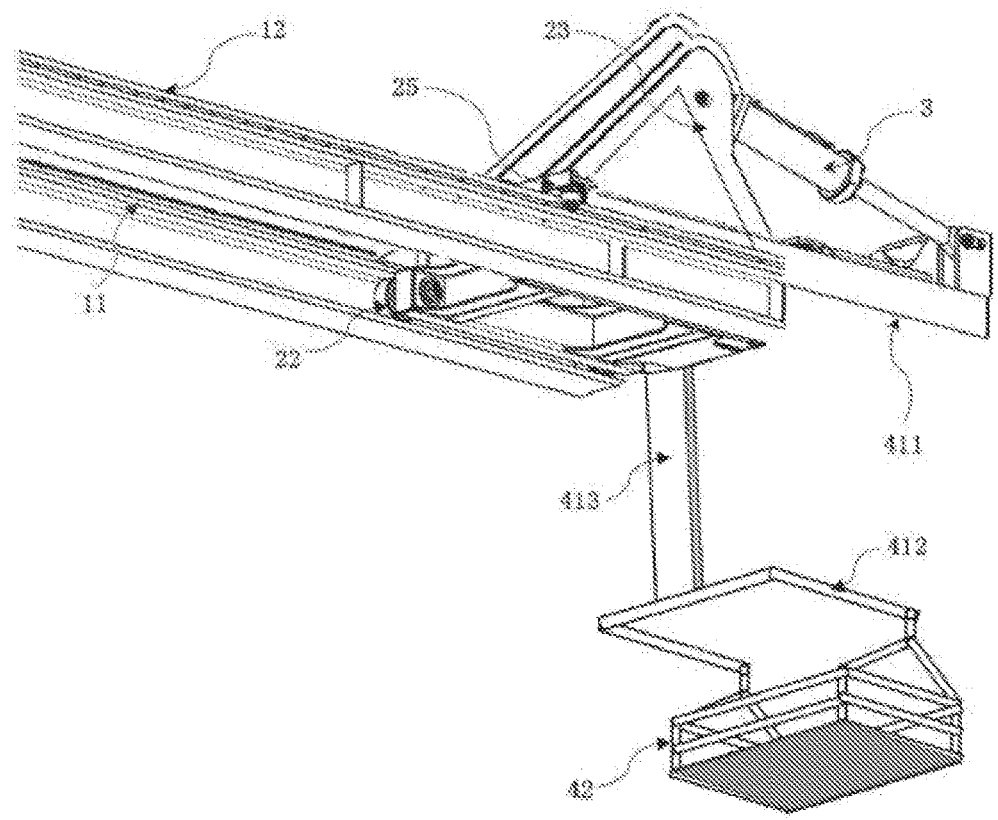
FIG. 2 is a schematic diagram of a partial structure of the present disclosure.
Figure 3:
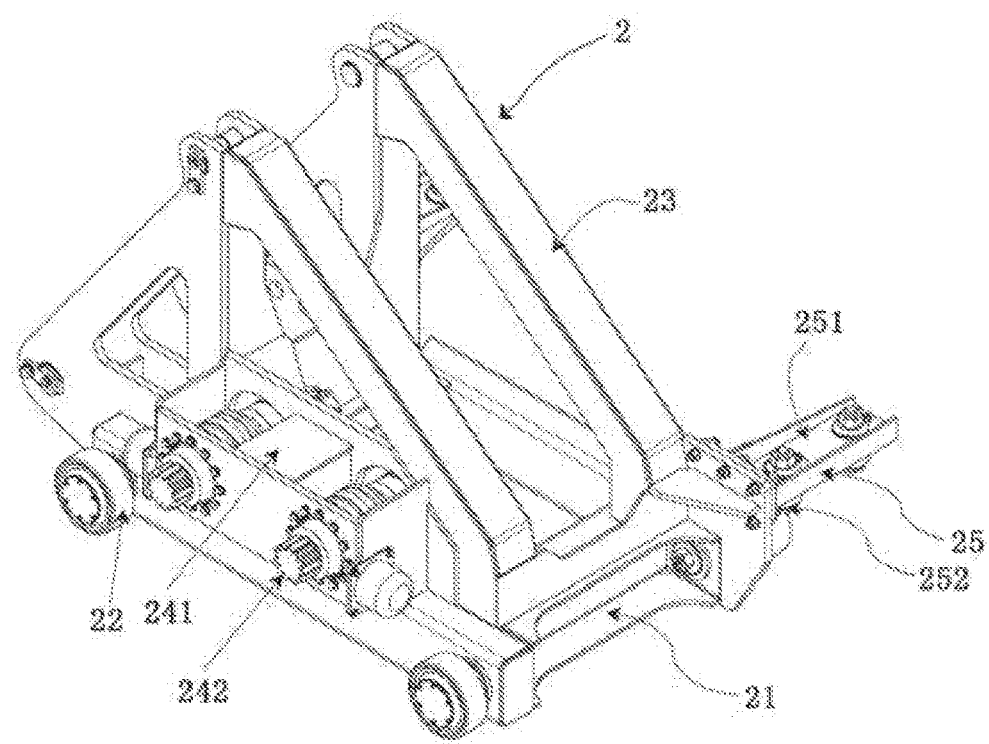
FIG. 3 is a structure diagram of a moving mechanism of the present disclosure.
Figure 4:
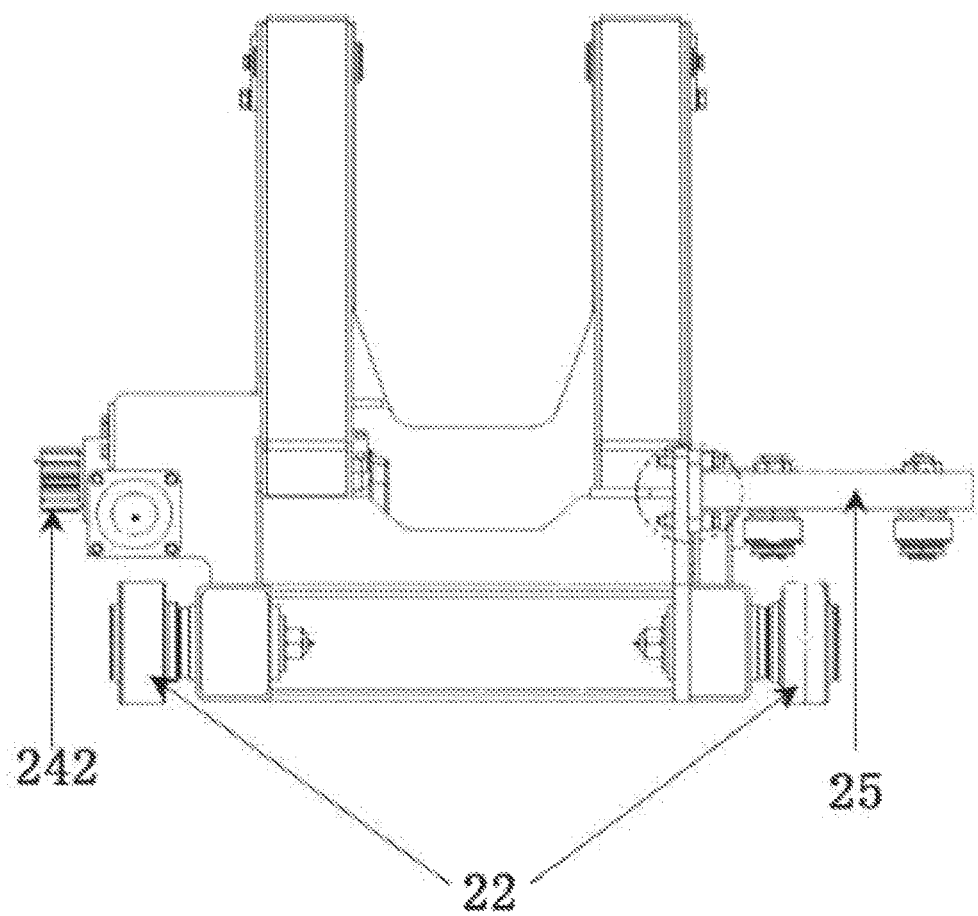
FIG. 4 is a side view of the moving mechanism of the present disclosure.
Figure 5:
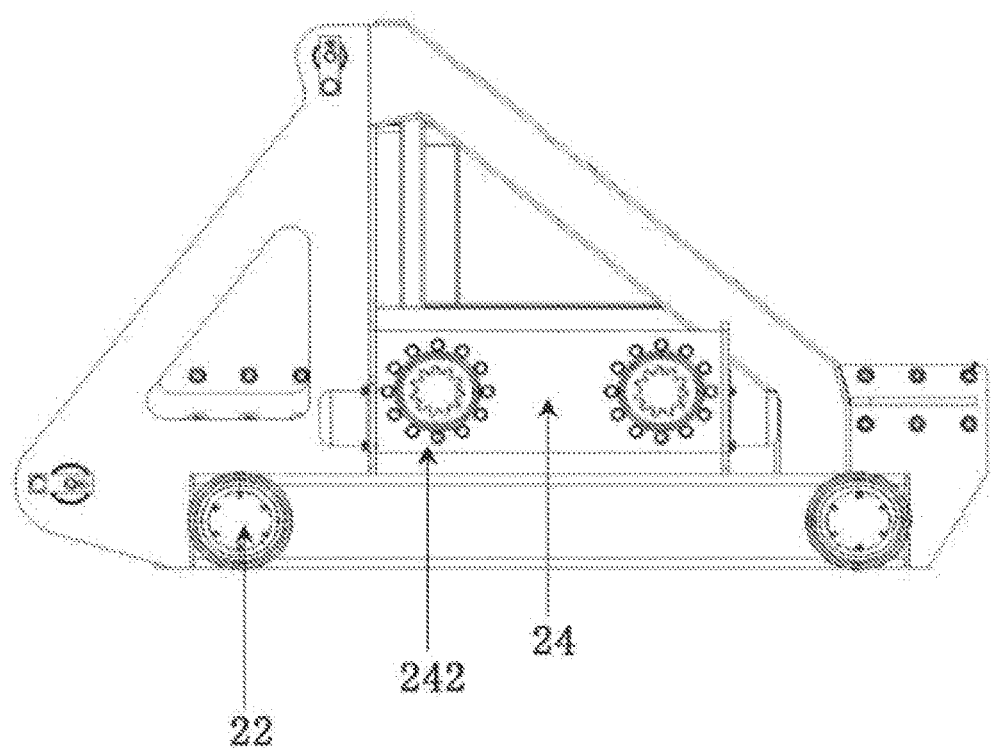
FIG. 5 is a front view of the moving mechanism of the present disclosure.
Figure 6:
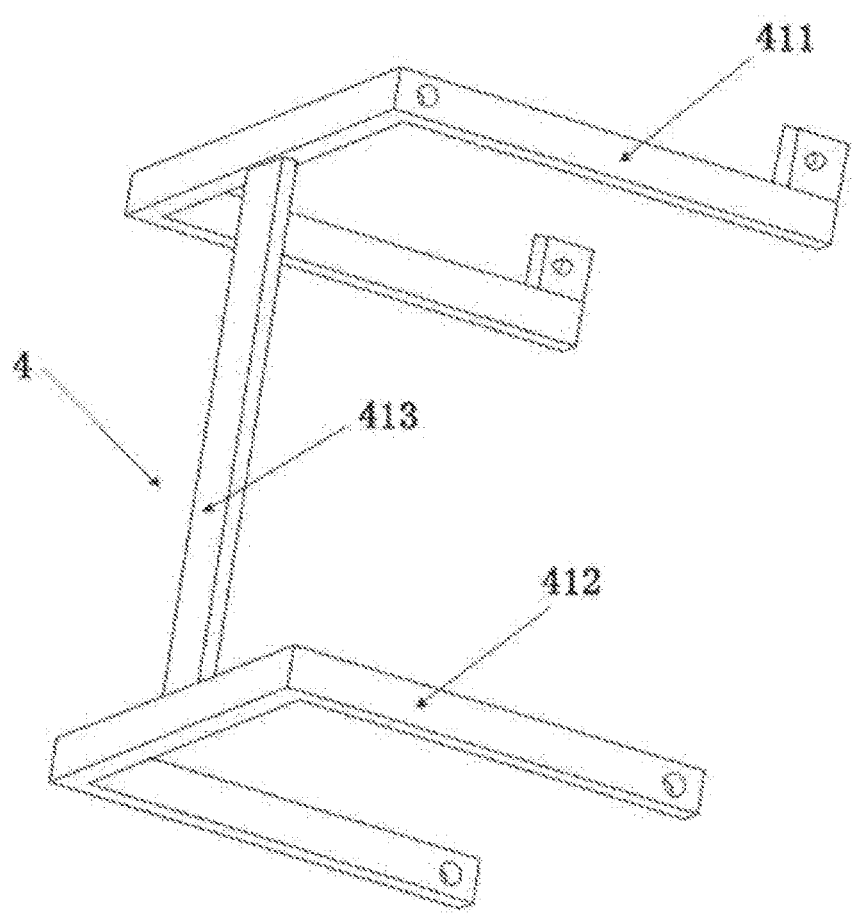
FIG. 6 is a structure diagram of a lifting frame of the present disclosure.
Figure 7:
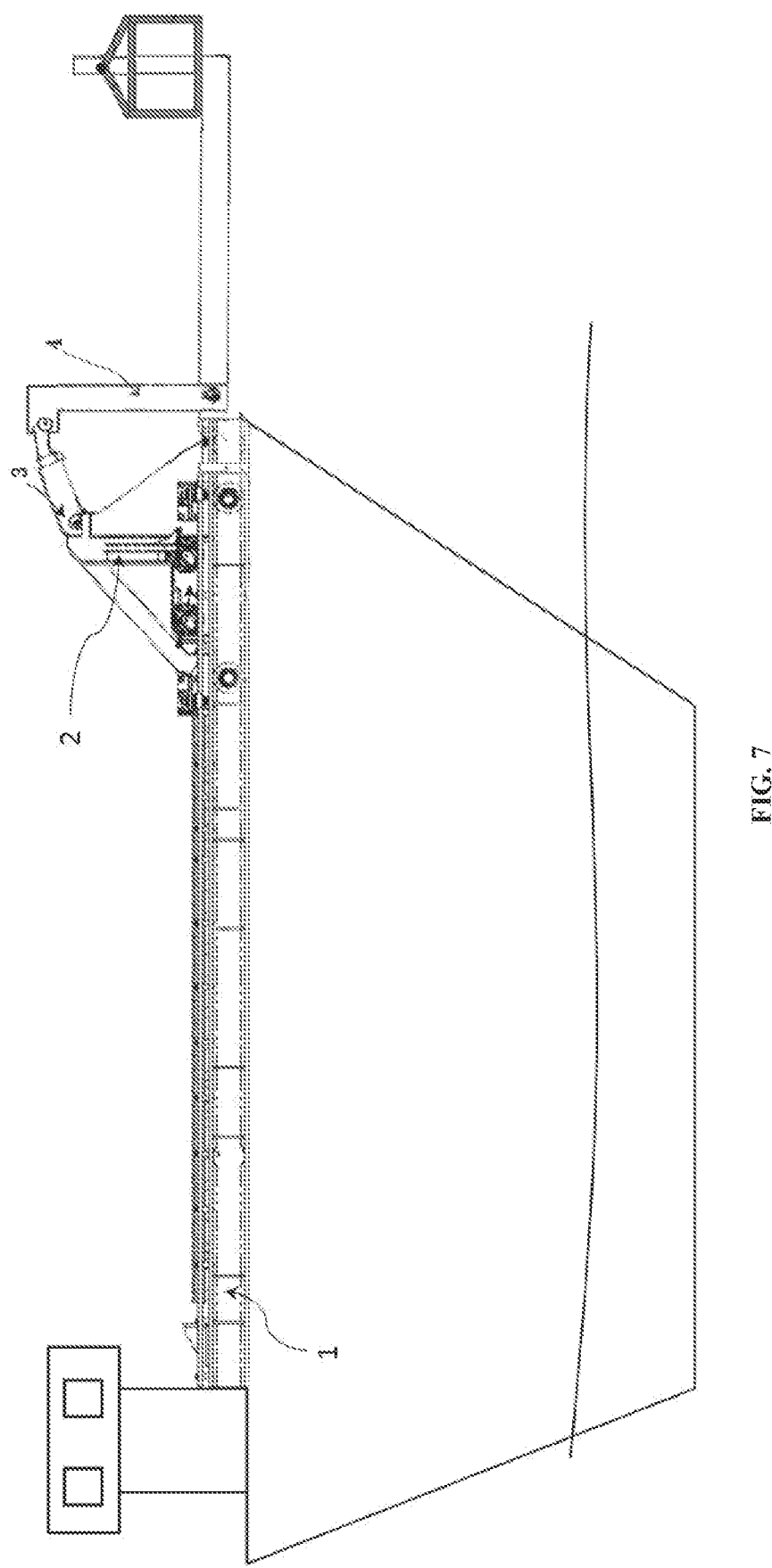
FIG. 7 is a schematic diagram of a using process of the present disclosure.

Reference numerals: 1. rail assembly, 11. rack, 12. guide rail, 2. moving mechanism, 21. base, 22. sliding wheel, 23. frame, 24. actuating device, 241. power device, 242. gear, 25. guide mechanism, 251. bracket, 252. guide wheel, 3. power unit, 4. lifting frame, 411. upper frame, 412. lower frame, 413. connecting rod, and 42. suspension coop.

DETAILED DESCRIPTION OF THE EMBODIMENTS

The present disclosure will be further described below with reference to the accompanying drawings.

As shown in FIG. 1, a device for launching and recovering a box sampler of the present disclosure includes a suspension coop 42, a rail assembly 1, a moving mechanism 2, a power unit 3, and a lifting frame 4, where the rail assembly 1 is fixedly arranged on a deck. The moving mechanism 2 is provided in rail assembly 1 and can move along rail assembly 1. A fixed end of the power unit 3 is articulated with a top end of the moving mechanism 2, and an extending end of the power unit 3 is articulated with an open end of an upper frame 411 of the lifting frame 4. A closed end of the upper frame 411 of lifting frame 4 is articulated with a front end of the moving mechanism 2.

The moving mechanism 2 is provided with an actuating device 24 capable of driving the moving mechanism 2 to move on the rail assembly 1. When the power unit 3 retracts, the upper frame 411 and a lower frame 412 of the lifting frame 4 are vertical and the suspension coop articulated with the lower frame 412 is open upwards by gravity, such that the sampler can be conveniently put into or taken out of the suspension coop. When extending, the power unit 3 drives the lifting frame 4 to rotate. When the upper frame 411 and the lower frame 412 are horizontal, the power unit 3 stops extending.

The rail assembly 1 includes two parallel rails, where one rail is provided with a rack 11 and the other rail is provided with a guide rail 12.

The rack 11 is meshed with gears 242 on the moving mechanism 2. By driving the actuating device 24, the gears 242 rotate to drive the moving mechanism 2 to move on the rail assembly 1.

The moving mechanism 2 includes a base 21, sliding wheels 22, a frame 23, and the actuating device 24. Two sliding wheels 22 are arranged on each of the two sides of the base 21. The sliding wheel 22 is provided in the rail and can slide on the rail. The frame 23 includes two triangular frame bodies which are fixedly arranged on the base 21 in parallel. Articulation holes are formed in both the top end and a front end of the frame 23. The actuating device 24 is fixedly arranged on the base 21 and is located on the outer side of the frame 23.

The top end of the frame 23 is articulated with the fixed end of the power unit 3, and the front end of the frame 23 is articulated with the upper frame 411. When the power unit 3 extends and retracts, the lifting frame 4 can rotate around the articulation point.

The lifting frame 4 includes the upper frame 411, the lower frame 412, and a connecting rod 413, where the connecting rod 413 connects the upper frame 411 to the lower frame 412. An open end of the lower frame 412 is articulated with the suspension coop 42.

The upper frame 411 and the lower frame 412 are both U-shaped. The open end of the upper frame 411 protrudes upwards to be conveniently articulated with the fixed end of the power unit 3. The open end of the lower frame 412 is articulated with two lifting lugs of the suspension coop 42. The suspension coop 42 is located in the middle of the lower frame 412.

The actuating device 24 includes a power device 241 and the gears 242, where two gears 242 are in transmission connection with the power device 241 and are meshed with the rack 11.

By means of the meshing between the gear 242 and the rack 11, the power device 241 in the transmission connection with the gear 242 drives the moving mechanism 2 to move along the rail assembly 1. The movement is smooth, accurate, and convenient to operate.

The moving mechanism 2 further includes guide mechanisms 25. The guide mechanism 25 is detachably arranged at a side edge of the base 21 and is located on a side of the base 21, which is not provided with the actuating device 24. The guide mechanism 25 is provided in the guide rail 12. Two guide mechanisms 25 are arranged on the same side of the base 21.

The guide mechanism 25 includes a bracket 251 and two guide wheels 252, where the bracket 251 is detachably connected to the base 21. The two guide wheels 252 are detachably arranged on a lower surface of the bracket 251; and the two guide wheels 252 are respectively located on a side of the guide rail 12 and can roll along the guide rail 12.

The guide mechanism 25 is provided in the guide rail. During the movement, the moving mechanism 2 can be commendably guided by the two guide mechanisms 25 located at the front end and the rear end of the base 21, so as to move smoothly. In this way, the moving mechanism 2 is prevented from being stuck due to its angle deviation during the movement.

The power unit 3 includes two parallel hydraulic oil cylinders or hydraulic air cylinders.

The application process of the present application is as follows: When the box sampler needs to be launched, the power unit 3 retracts. In this case, the connecting rod 413 is parallel to the rail assembly 1, and the suspension coop 42 is articulated with the lower frame 412 and is open upwards. At this time, the moving mechanism 2 moves to be within an action range of the A-frame under the action of the actuating device 24, and a cable is pulled by the winch on the ship to be rove through a pulley of the A-frame to lift the box sampler into the suspension coop 42. Meanwhile, the cable is pulled by the winch to be kept tightened, but the box sampler is kept in the suspension coop. When the A-frame swings towards the stern of the ship, the moving mechanism 2 moves to the stern, and the power unit 3 starts to extend till the connecting rod 413 turns over to be perpendicular to the rail assembly 1. In this case, the suspension coop is located below the stern and is kept open upwards all the time. When the suspension coop enters water, the cable is pulled back by the winch to lift the box sampler out of the suspension coop and then is released till a closed shovel is triggered to complete sampling in a way that the box sampler is brought into contact with a seabed. When the box sampler is recovered and is about to come out of the water, the winch lifts the box sampler into the suspension coop, the cable is pulled by the winch to be kept tightened, the power unit 3 starts to retract till the connecting rod 413 is parallel to the rail assembly 1, and the moving mechanism 2 moves to a proper position of the deck under the action of the actuating device 24 to facilitate sampling. During the entire process of launching and recovering the box sampler, the operation is easy and convenient, the movement is smooth. It is not necessary to stop the box sampler from shaking by operators, which saves manpower and reduces the risk of danger to the operators.

It should be noted that in the description of the present disclosure, orientations or position relationships are indicated by terms, such as "front end", "rear end", "left", "right", "upper", "lower", and "horizontal" based on the drawings. These terms are merely used to facilitate and simplify the description, rather than to indicate or imply that the mentioned apparatus or elements must have a specific orientation and must be established and operated in a specific orientation. Therefore, these terms should not be understood as a limitation to the present disclosure.

In the description of the present disclosure, it should be noted that, unless otherwise clearly specified and defined, meanings of the terms "arrange", "install", "connected with", "connected to", and "communication" should be understood in a broad sense. For example, the connection may be a fixed connection, a removable connection, or an integral connection; may be a mechanical connection or an electrical connection; may be a direct connection or an indirect connection by using an intermediate medium; or may be an intercommunication between two components. Those of ordinary skill in the art may understand specific meanings of the above terms in the present disclosure based on a specific situation.

Certainly, the above-mentioned embodiments are merely preferred embodiments of the present disclosure and are not to be construed as limiting the scope of the embodiments of the present disclosure. The present disclosure is not limited to the above-mentioned examples, and equivalent changes, modifications, and the like made by those of ordinary skill in the art within the essential scope of the present disclosure should all fall within the scope covered by the patent of the present disclosure.

What is claimed is:

1. A device for launching and recovering a box sampler, comprising a suspension coop, a rail assembly, a moving mechanism, a power unit, and a lifting frame; wherein,
   the rail assembly is fixedly arranged on a deck; the moving mechanism is arranged on the rail assembly, and is movable along the rail assembly; a fixed end of the power unit is articulated with a top end of the moving mechanism, and an extending end of the power unit is articulated with a open end of an upper frame of the lifting frame; and a closed end of the upper frame of the lifting frame is articulated with a front end of the moving mechanism;
   the lifting frame comprises the upper frame, a lower frame, and a connecting rod, wherein the connecting rod connects the upper frame to the lower frame, and an open end of the lower frame is articulated with the suspension coop;
   the rail assembly comprises two parallel rails, wherein one rail is provided with a rack, and the other rail is provided with a guide rail;
   the moving mechanism comprises a base, sliding wheels, a frame, and an actuating device; two sliding wheels are arranged on each of two sides of the base; the sliding wheels are provided in the rails and are allowed to slide on the rails; the frame comprises two triangular frame bodies which are fixedly arranged on the base in parallel; articulation holes are formed in both a top end and a front end of the frame; and the actuating device is fixedly arranged on the base, and is located on an outer side of the frame;
   the moving mechanism further comprises a guide mechanism; the guide mechanism is detachably arranged at a side edge of the base, and is located on a side of the base where the actuating device is not provided; and the guide mechanism is provided in the guide rail;
   the guide mechanism comprises a bracket and two guide wheels, wherein the bracket is detachably connected to the base; the two guide wheels are detachably arranged on a lower surface of the bracket and the two guide wheels are respectively located on a side of the guide rail, and are allowed to roll along the guide rail.

2. The device for launching and recovering the box sampler according to claim 1, wherein the actuating device comprises a power device and gears, wherein the gears are connected with and driven by the power device, and the gears are meshed with the rack.

3. The device for launching and recovering the box sampler according to claim 1, wherein the power unit comprises two parallel hydraulic oil cylinders or hydraulic air cylinders.

4. The device for launching and recovering the box sampler according to claim 1, wherein the actuating device comprises two gears.

5. The device for launching and recovering the box sampler according to claim 1, wherein two guide mechanisms are arranged on the same side edge of the base.

* * * * *